J. T. Smith.
Card Rack.
No. 100,940. Patented Mar. 15, 1870.

Witnesses.
E. W. Anderson.
D. D. Kane.

Inventor.
J. T. Smith
by Chipman Hosmer & Co
Attorneys.

United States Patent Office.

JOSEPH T. SMITH, OF LOUISVILLE, KENTUCKY.

Letters Patent No. 100,940, dated March 15, 1870.

IMPROVEMENT IN RAILROAD CONDUCTORS' TICKET-CASES.

The Schedule referred to in these Letters Patent and making part of the same

*To all whom it may concern:*

Be it known that I, JOSEPH T. SMITH, of Louisville, in the county of Jefferson, and State of Kentucky, have invented a new and valuable Improvement in Railroad-Ticket Canceling-Apparatus; and I do hereby declare that the following is a full, clear, and exact description of the construction and operation of the same, reference being had to the annexed drawings making a part of this specification, and to the letters and figures of reference marked thereon.

Figure 1:
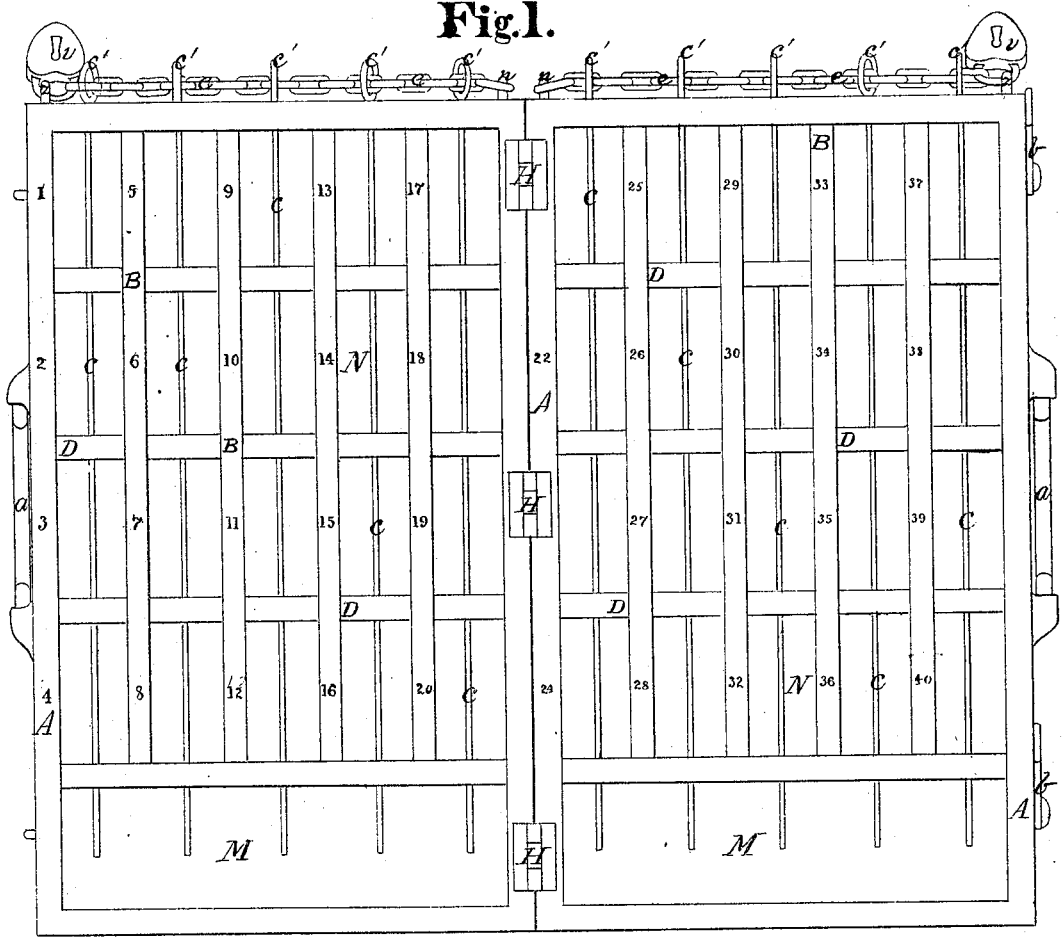

Figure 1 of the drawings is a representation of my invention thrown open, showing the compartments in plan view.

Figure 2:
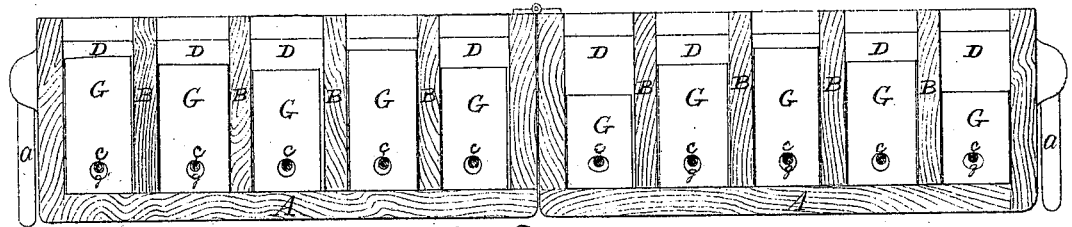

Figure 2 is a vertical cross-section of the same.

My invention relates to the collection of fares on railroads, and consists, mainly, of the construction and novel arrangement of devices whereby fraud on the part of ticket-agents and conductors is prevented.

It is well known that fraud in the collection of fares can be readily practiced on railway cars by conductors, who ordinarily have charge not only of the sale of way-station tickets, but also of the collection of the same. Also, when a special ticket-agent is employed for the sale of tickets to be afterward collected by the conductor, there may be fraud by collusion. It is the object of my invention to prevent all such collusion and fraud.

For this purpose the passenger-agents' ticket-box A is prepared. It is divided in half, as shown in the drawings, the halves being hinged together at the back, and formed to close up tightly to each other after the fashion of the valise.

Handles *a a* are attached to the box on the opposite side from the hinges.

When not in use the box is kept closed by means of the hooks *b b* and staples.

Each half of the box is divided into long narrow compartments longitudinally by the strips B B, and these long narrow compartments are subdivided crosswise by the strips D D, forming a number of pigeon-holes of suitable size to carry tickets. These pigeon-holes are numbered to correspond with the regular order of stations from one terminus to the other of any given road, commencing with number one.

The walls or partitions between the ends of the little compartments have openings to admit of the passage of a wire or other instrument lengthwise through each series of partitions from end to end of the box. In the drawings these wires or rods are lettered *c c*.

The tickets *l* used in connection with this box also have holes punched or otherwise perforated in them, through which these wires *c c* pass, thus securing the tickets in the box.

The rods or wires *c c* are fastened in position in such a manner that they can only be removed by the authorized cashier or confidential agent in possession of the necessary keys. One manner of accomplishing this is shown in the drawings.

The ends of the wires which appear on the outside of the box are formed into rings, *c' c'*, through which chains *e e*, attached, one to each half of the box, by staples *n n*, pass, and are fastened at their other ends to the staples *z z* by the padlocks *v v*. The other ends of the wires *c c* pass entirely through the partitions into receptacles M M, divided off from those portions containing the ticket-boxes N N.

Instead of a chain, a wire or slide may be used. Or, the partitions M M may be closed with hinged covers, capable of being locked, and the wires *c c* having been passed down through the partitions into these receptacles M M, may be locked in position by means of springs placed therein.

H H represent the hinges of the ticket-box A.

G G designate the tickets used in connection with my ticket-box. They are of the usual form and size, and have near the lower end the holes *g g*, punched as above stated. Each station has its own tickets, printed with the name of the station across the head of the ticket or lengthwise, in red or other colored ink, over the face of the same. The tickets for each station are placed in the pigeon-hole of the ticket-box which bears the number corresponding to that station.

The above-described ticket-box is placed in the hands of a passenger ticket-agent, who is charged with all the tickets in the box. This agent enters the cars, calling on each passenger to state the point to which he desires to go, and, being informed, selects the desired ticket, marks thereon with indelible pencil or ink the number of the station at which said passenger entered the cars. He gives this ticket to the passenger, passing on until all are supplied. It should be his duty to see that all passengers have tickets, and to supply all those who get on at way-stations.

A regular conductor is also employed, who is the cash and ticket-collector. He follows the passenger ticket-agent, calls for the tickets distributed by him, and noting thereon the point of entry and destination of each passenger, is enabled to call for the proper fare at once. The tickets and cash thus pass into the hands of the conductor, by whom they are returned to the cashier or general ticket-agent, who holds the keys of the ticket-box. This box will show that certain tickets have been removed from it. These tickets, with the corresponding amount of cash, must be returned by the conductor.

If so desired, the passenger ticket-agent may be instructed to mark, in addition to the number of the station at which the passenger entered the cars, the amount of fare.

Sometimes it may be preferable to divide each station ticket-compartment N into two subdivisions, one of which shall contain tickets printed to the station, the other tickets printed from the same station. When this method is employed, each passenger will have delivered to him, by the agent carrying the box, two tickets, one showing the point of entry, and the other the destination of the traveler, forming a double or combined ticket, which will show to the railroad company the amount of money due from the passenger.

To guard still further against fraud, one or more frames should be hung inside of each passenger-coach, conspicuously, on both sides of which should be printed a notice to the traveling public, somewhat as follows:

"Notice to passengers.

"Each passenger will be furnished with a ticket by the passenger ticket-agent on the train.

"The conductor is not at liberty to collect fare from passengers not thus supplied. Any one reporting neglect of these rules will receive the thanks of the officers of the road."

The tickets are canceled by being torn off from the wires or rods $e\ c$.

What I claim as my invention, and desire to secure by Letters Patent, is—

1. The hinged ticket-box herein described, having ticket compartments N, receptacles M, canceling-rods $c$, chains $e$, staples $n$ and $z$, and locks $v$, constructed and arranged to operate as specified.

2. The locked canceling-rods $c$, arranged to hold and cancel tickets in a ticket-box, as described.

3. In combination with the locked canceling-rods $c$, the perforated tickets G, when constructed as and for the purposes specified.

In testimony that I claim the above, I have hereunto subscribed my name in the presence of two witnesses.

JOSEPH T. SMITH.

Witnesses:
  JOHN E. PYLE,
  JOHN K. BOSWELL.